Figure 2:
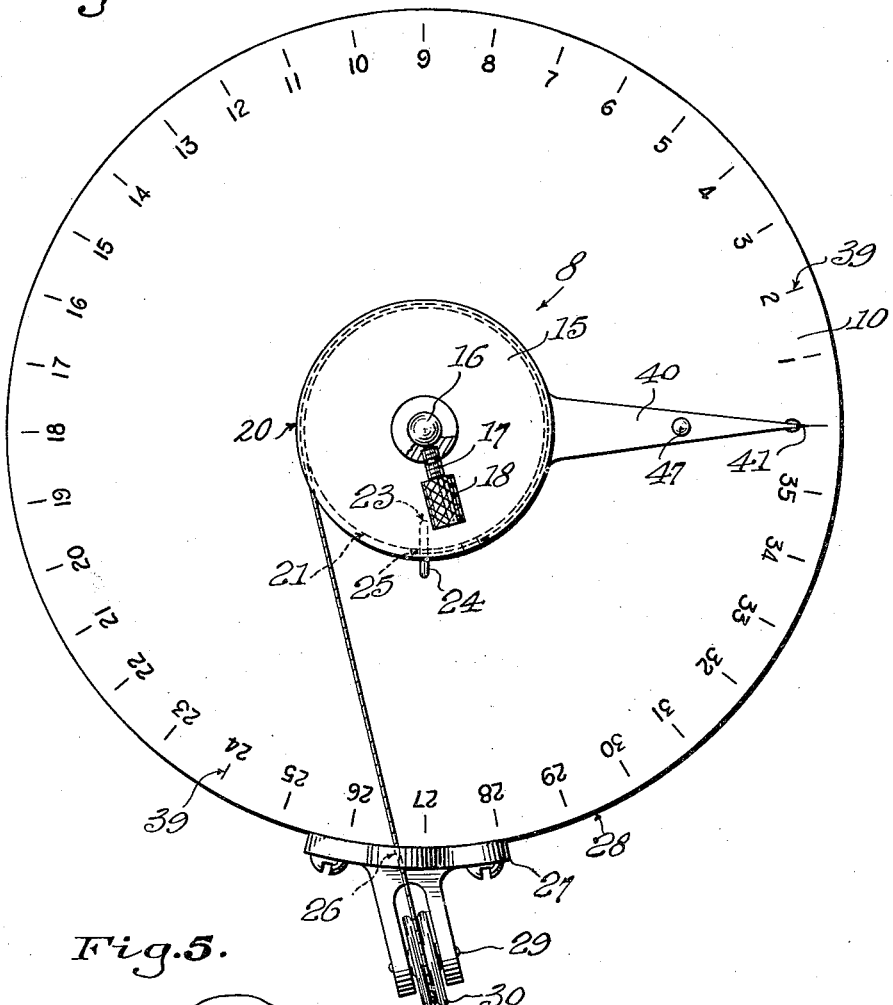
Figure 5:
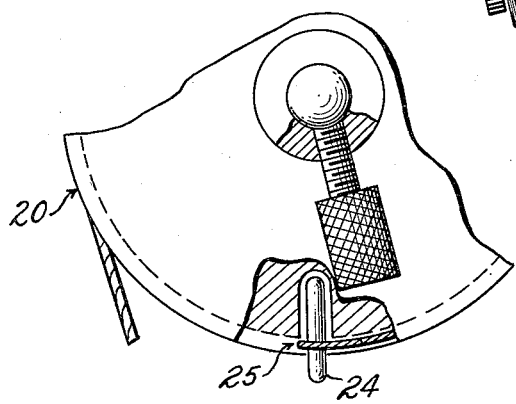

Dec. 12, 1950         H. BARNARD ET AL         2,533,213
                      CONSISTENCY METER
Filed Aug. 18, 1947                      2 Sheets-Sheet 1
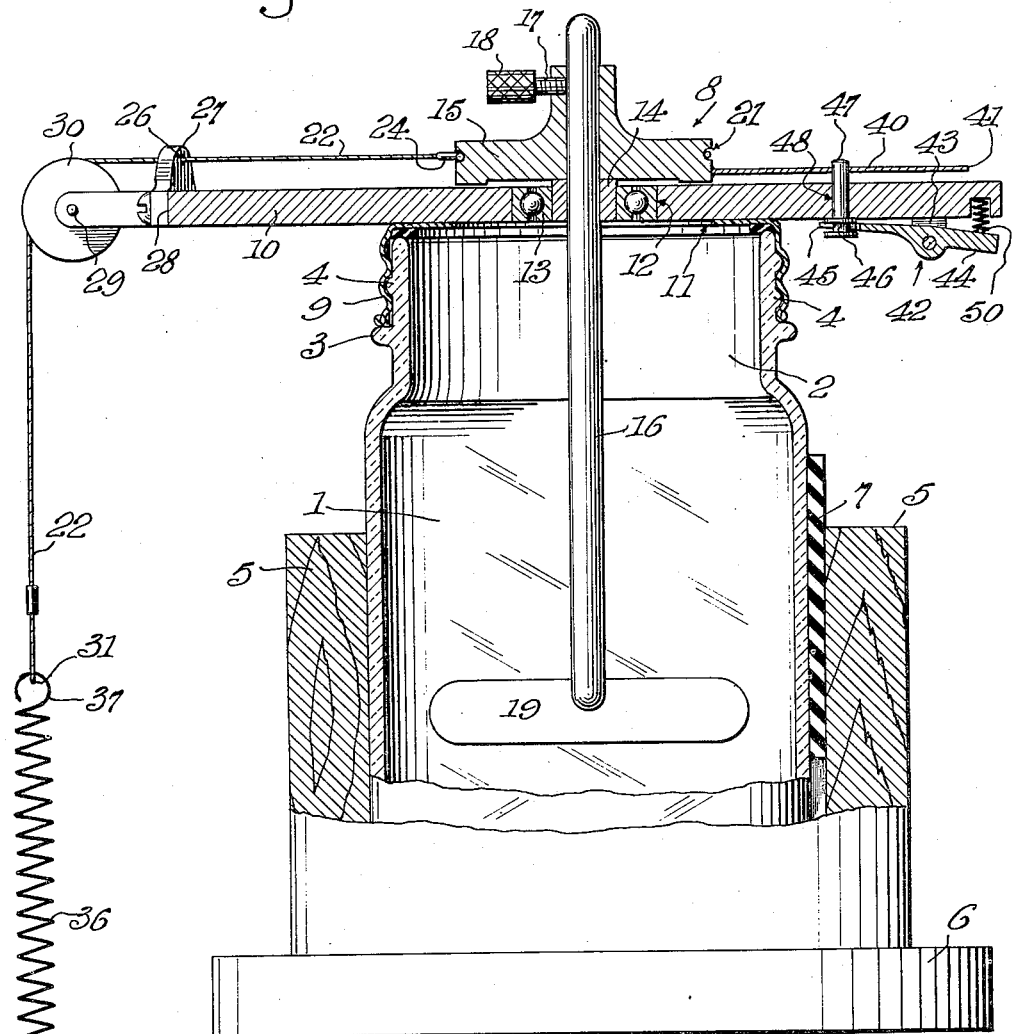
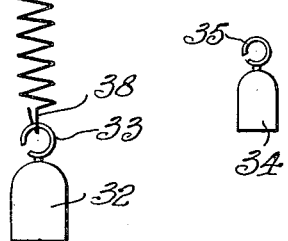
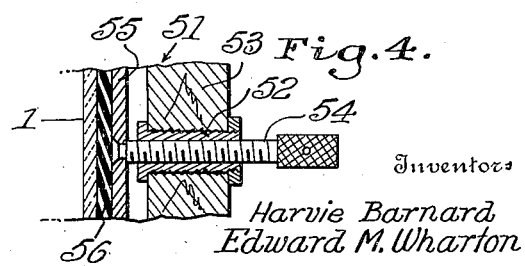
Inventors
Harvie Barnard
Edward M. Wharton
By Carlton C. Davis
Attorney Dec. 12, 1950 H. BARNARD ET AL 2,533,213
CONSISTENCY METER
Filed Aug. 18, 1947 2 Sheets-Sheet 2

Inventors.
Harvie Barnard
Edward M. Wharton
By Carlton C. Davis
Attorney

Patented Dec. 12, 1950

2,533,213

UNITED STATES PATENT OFFICE 2,533,213

CONSISTENCY METER

Harvie Barnard, Clinton, Iowa, and Edward M. Wharton, Bound Brook, N. J., assignors to the United States of America as represented by the Secretary of War Application August 18, 1947, Serial No. 769,288

3 Claims. (Cl. 73—59)

(Granted under the act of March 3, 1883, as amended April 30, 1928; 370 O. G. 757)

This invention relates to improvements in measuring the consistency and the "spring-backiness" of elastic viscous substances, such as gelled gasoline incendiaries.

The invention described herein may be manufactured and used by and for the Government for governmental purposes without the payment to us of any royalty thereon.

"Spring-backiness," i. e., the tendency to quickly rebound and quickly reform after an initial stress has been applied, is a highly valued characteristic of thickened liquid and gelled gasolines and other hydrocarbon liquid fuel incendiaries adaptable for use in grenades and bombs for destroying enemy facilities and constructions. For this reason many attempts have been made to provide an apparatus which is adapted to satisfactorily determine the tendency of these incendiaries to rebound after an initial stress has been applied and to make certain that these incendiaries have this property to the desired degree. Unfortunately, insofar as is known to the applicants, no device of the prior art has been found to be satisfactory for this purpose.

The Stormer type of viscosimeter, which makes use of a cylinder or paddles adapted to rotate continuously a large number of revolutions within a test cup, after numerous tests, was found to be the best available mechanism, but it has been more than clearly demonstrated that neither the Stormer viscosimeter nor modified forms thereof are capable of providing satisfactory determinations. The cause of this failure to operate satisfactorily is not fully understood but it is considered significant that these incendiaries have a pronounced tendency to climb up on the cylinders or paddles after they have been rotated a few revolutions; that as the revolutions are continued the movement of the rotor becomes jerky and erratic and that the initial R. P. M.'s are not infrequently quite different from those obtained at the end of the test.

One of the purposes of this invention is therefore to provide improved ways and means for determining the "spring-backiness" of thickened and gelled liquid incendiaries during an initial or fraction of an initial complete rotation of the paddles.

A further object is the provision of an improved device of the character described, whereby the consistency of viscous fluids and gels can be readily determined during the first one or two revolutions of the rotor of the device.

A further purpose is to provide an improved torsiometer which is particularly adapted to be quickly set up, adjusted and readjusted and to rapidly make a repeated number of tests.

A more general purpose of the present invention is to provide improved ways and means for determining the rheological condition of rubbery, pasty, dough-like, and gelatinous masses.

Other and further purposes of this invention will become apparent from the following specification, the appended claims and from the accompanying drawings, in which Figure 1 is a partly elevational and partly sectional view showing a preferred embodiment of this invention, Figure 2 is a top plan view of the same, Figure 3 is a side elevational view depicting an accessory for the apparatus shown in Figure 1, and Figure 4 is a fragmentary and partly sectional view illustrating a modification of the container shown in Figure 1.

In carrying out the method of this invention, use is preferably made of data which has been previously obtained in testing samples of highly satisfactory thickened liquid incendiaries with any suitable device, such as the mechanism of this invention under a wide range of temperature and moisture conditions and this data is chosen as a standard of comparison by which the rheological characteristics of fluids to be tested are evaluated in a manner which will become apparent as the specification proceeds.

For reasons of efficiency and economy, a plurality of any suitable containers, such as glass fruit jars, are preferably used in carrying out the method employed in this invention. In normal practice a number of these containers are partially filled with samples of the incendiary thickened liquids or gels (hereinafter referred to as liquids and incendiaries) whose viscosities and "spring-backiness" are to be determined for any reason, for instance, to control production.

After being placed in the containers, these incendiaries are permitted to remain in a quiescent condition preferably for a few days in order to make certain that the liquids have become stabilized before the "spring-backiness" and consistency determinations are made.

A type of glass jar 1 is depicted in Figure 1 which has been found to be particularly serviceable for this purpose. This jar is preferably substantially rectangular in cross-section, except at its neck 2 which is circular and is preferably provided with the conventional annular bead 3 and external thread 4.

Preparatory to making a determination, the glass jar is sufficiently filled with the thickened liquid incendiary to cover hereinafter-to-be-described paddles which are to be rotated in the liquid when the determination is being made.

In actual practice, it has been found that if the jar is half filled with the substance to be treated, or at least filled sufficiently to cover the paddles two inches, that more consistent results may be obtained.

At the time a determination is to be made, the glass jar is placed in and clampingly secured to any suitable container 5 which may be made of any suitable material, such as wood, which is adapted to dampen mechanical vibrations. This container is preferably provided with a broad base portion 6 to prevent the jar from being easily overturned, and is made rectangular in cross-section and of a size adapted to easily receive the jar.

In order to prevent the jar from slipping, turning, or otherwise moving in the container, either a suitable wedge 7, which may be made of rubber, is tightly inserted in the container substantially as shown or the jar is tightly secured in the container by some other suitable means, such as a hereinafter-to-be-described clamping means depicted in Figure 4.

Referring again to Figure 1, there is also provided a torsiometer mechanism 8 which is adapted to rotate paddles in the incendiary. This mechanism includes a metal screw cap 9 and a stiff circular metal disc 10 placed and secured thereon by any suitable means (not shown).

For a purpose which will become apparent as the specification proceeds, this disc preferably has a diameter which is at least twice as long as the diameter of the cap. The cap and the disc are provided with circular open portions 11 and 12 respectively, the latter of which is preferably slightly tapered or chamfered to serve as a seat for a bearing ring assembly 13. This assembly may be frictionally or otherwise secured to a collar 14 which is made thicker than the disc to support a pulley 15 above, and out of contact with, the upper surface of the disc. There is detachably threaded through the pulley 15 a shaft 16 which is detachably secured to the pulley by any suitable means, such as a threaded bolt 17 having a knurled head 18. This shaft is also threaded through the collar 14 and is provided at its lower end with a plurality of preferably flat radially extending paddles 19 having sides which extend in the plane of the longitudinally extending center line of the shaft.

The rim portion 20 of this pulley may be provided with a helical groove 21 which extends at least twice around the pulley and provides a suitable recessed means for retaining a cable 22 which in operation, see Figure 2, is wound around this pulley and looped at either end for purposes which will become more apparent as the specification proceeds.

A radially extending recess 23 is provided on the rim of this pulley for detachably receiving a pin 24 which serves as a post for a looped end 25 of the cable when the cable is wound around the pulley and threaded through an open portion 26 provided in a bracket 27 which is fixedly secured to the rim portion 28 of the disc and serves as a support for a shaft 29 carrying a small cord pulley 30 which extends well beyond the circumference of the disc and the periphery of the container. After the cable is wound around the pulley 15 and threaded through the bracket 27, it is passed over the pulley 30 and on its looped end portion 31 there is connected either a heavier weight 32 having a hooked portion 33 (preferably weighing 500 grams) or a somewhat lighter weight 34 having a hooked portion 35, according to whether an elasticity or consistency test is to be run. When the heavier weight is used, it is preferably resiliently connected to the suspended looped end portion of the cable to prevent the assembly from being unduly jolted. This, of course, may be done by any suitable means, such as a helical spring 36 having looped end portions 37, 38, whereby the connection may be conveniently made.

Before making a test or determination, the glass jar is inserted and clampingly secured to the container and the container is placed on a table or bench (not shown) sufficiently near an outer edge of the support to insure that the weight may be raised and lowered without any obstruction interfering with the proper operation of the device.

Referring now to Figures 1 and 2, it will be noted that an azimuthal scale 39 is etched or otherwise placed on the upper surface of the disc and that a radially extending pointer or indicator bar 40 having an open portion 41 is provided on the pulley 15 in a manner whereby the angular position of the pulley may be conveniently indicated at any time.

Some suitable means, such as a movable abutment means 42 is also provided on the disc whereby the pulley and its rigidly associated parts may be, at the will of the operator, locked at the zero position on the scale, released from that position and prevented from rotating more than 360°. This abutment means 42 may be movably connected to the disc by a bracket 43. This means includes a spring-pressed lever 44 which has a forked end portion 45 extending into an annular groove 46 in the head of a bolt 47 which slidably projects upwardly through an open portion 48 extending through the disc and (except when the lever is manually moved) into an open portion provided in the indicator bar. When the trigger lever is moved upwardly against the action of its spring 50, this bolt is depressed and releases the indicator bar, in a manner which may be well understood by referring to Figure 1.

In practice, the elasticity test is followed by the consistency test and the only change which need be made in the assembly is that the helical spring and the heavier weight may be detached from the looped end portion of the cable and the lighter weight directly hung on to the cable.

The elasticity test is carried out with the cable wound but once around the pulley. A stop watch or the like (not shown) is started and simultaneously the trigger lever is momentarily squeezed to start the rotation of the paddles. These paddles then make one rotation, at which time they are stopped by the pointer bar being brought into contact with the bolt 47, which has by this time returned to its normal raised position. At this point the weighted cable slips off its retaining pin or post 23 and the torsional stress set up in the liquid by the rotation of the paddles reverses the direction of the rotation of the paddles. After 40 seconds have elapsed, since the paddles have made their first rotation, the position of the pointer is read to the nearest 10° mark on the scale.

The shaft is now loosened on the pulley, the pointer bar quickly reset and locked in the zero position on the scale. The shaft is then again bolted to the pulley, the cable rewound once on the pulley and 60 seconds plus or minus 3 seconds after the first test is begun a second and identical test is made. If these two consecutive readings agree within 10 degrees on the scale, the average of these two readings is accepted for comparison with the before-mentioned acquired data, if not the operation is repeated and repeated until two such consecutive readings are obtained, at which time their average is accepted as the data to be obtained in the test.

The consistency test is then begun between 30 and 90 seconds after the elasticity test has been completed with the same assembly, except that the smaller weight is directly connected to the cable and is used instead of the larger weight and the helical spring and the cable is wound twice instead of once around the pulley 15.

Before beginning the consistency test, however, the shaft is again loosened on the pulley and the pointer bar is set on the zero mark and locked in this position by the trigger lever-operated rod. The pulley is now once more secured to the shaft and the second hand of the stop watch set at zero. The trigger lever is then pressed and held in its upper position as the stop watch is started and the paddles are now permitted to rotate for at least 60 seconds or for such longer period of time as may be required to make one complete revolution.

If, at the end of 60 seconds, the angular rotation of the pointer is more than 360°, the number of degrees of the rotation in 60 seconds is noted. If the paddles require a period of more than 60 seconds to make one rotation, the time required for this revolution is noted.

In either event, a second test is started 30 seconds plus or minus 3 seconds after the completion of the first test. If the average of the readings taken on the first two consecutive tests does not differ by more than 25% of the smaller of these two readings, it is accepted as the datum which is to be obtained. If not, a series of tests are made until two consecutive readings are obtained which meet the above requirement.

In Figure 4, there is shown a modified form of container 51 which renders the use of a resilient wedge, such as the wedge 7, unnecessary. This container may be identical with the container in Figure 1 except that a threaded collar 52 is inserted through the sidewall 53 of the container and a threaded bolt 54 is threadedly connected thereto and is rotatably secured at its inner end portion to a stiff plate member 55 having a rubber or other soft padding 56 thereon, whereby the jar may be clampingly secured in the container.

It will, of course, be understood that this specification discloses only preferred forms of this invention and that other modifications obviously may be made without departing from the spirit of the invention, or the scope of the appended claims. For instance, the use of the container may be dispensed with by tightly securing the receptacle in the desired position to any suitable rigid means, such as a post or the like, and the use of the screw cap may be dispensed with by substituting therefor any suitable clamping means adapted to secure and support the mechanism 3 safely on or above the neck of the receptacle.

We claim:

1. A torsiometer apparatus of the class described comprising a glass jar at least twice as high as it is wide for a liquid having an open threaded neck portion, a container substantially wider at its base than said jar for said jar adapted to serve as a base and a support therefor, a centrally apertured disc adapted to be mounted on and threadedly secured to said neck portion having a cable pulley extending beyond its circumferential portion, a shaft rotatably mounted in said disc and extending therethrough and being provided with paddles at one of its end portions for stirring said liquid and with a detachably connected shaft pulley above said disc, and a cable means adapted to be wound around said shaft pulley having a plurality of weights and being adapted to drive said pulley when the cable is wound around the shaft pulley, and has one of said weights suspended from an end portion of the cable.

2. A torsiometer apparatus of the class described comprising a receptacle substantially greater in height than in width for a liquid having an open neck portion, a container for said receptacle having a base portion substantially wider than said receptacle serving as a base and a support therefor, a centrally apertured disc having a diameter at least one and one half longer than the width of said receptacle mounted on said neck portion provided with a cable pulley extending beyond the circumferential portion of said disc, a shaft rotatably mounted on said disc and extending therethrough and being provided with paddles at one of its end portions for stirring said liquid and with a detachably connected shaft pulley above said disc for rotating said paddles, and a cable means adapted to be wound around said shaft pulley having a plurality of weights for driving said pulley when the cable is wound around the shaft pulley and having one of said weights freely suspended therefrom, said disc being provided on its upper surface with a circular azimuthal scale centrally positioned around the central aperture of said disc and said pulley being provided with a pointer whereby the angular position of the pulley on the disc is indicated.

3. A torsiometer apparatus of the class described comprising a glass jar at least twice as high as it is wide for a liquid having an open threaded neck portion, a container for said jar having a base substantially wider than the jar, a centrally apertured disc having a diameter more than one-fourth longer than the width of said jar mounted on and threadedly secured to said neck portion provided with a cable pulley and having a rotatably mounted shaft extending therethrough, said shaft being provided with paddles at one of its end portions for stirring said liquid in said receptacle, and with a detachably connected shaft pulley above said disc near its opposite end portion of said shaft, and a cable means adapted to be wound around the shaft pulley provided with a plurality of weights for driving said shaft pulley, when the cable is wound around the shaft pulley, passed over the cable pulley, and has one of said weights suspended therefrom at the lower end portion thereof, said disc being provided on its upper surface with a circular azimuthal scale centrally positioned around the central aperture of said disc, said pulley being provided with a pointer whereby the angular position of the pulley on the disc is indicated, and said disc being also provided with a movable abutment means whereby the rotation of the shaft pulley may be stopped after making any desired number of revolutions.

HARVIE BARNARD.
EDWARD M. WHARTON.

REFERENCES CITED

The following references are of record in the file of this patent:

UNITED STATES PATENTS

| Number | Name | Date |
|---|---|---|
| 722,576 | Grand | Mar. 10, 1903 |
| 2,427,796 | MacDonald | Sept. 23, 1947 |

FOREIGN PATENTS

| Number | Country | Date |
|---|---|---|
| 513,876 | Great Britain | Oct. 24, 1939 |